(12) United States Patent
Rong et al.

(10) Patent No.: US 10,824,215 B2
(45) Date of Patent: Nov. 3, 2020

(54) MANAGING POWER BUDGET OF MULTIPLE COMPUTING NODE CLUSTERS IN A COMPUTING RACK SYSTEM

(71) Applicant: Nutanix, Inc., San Jose, CA (US)

(72) Inventors: Yao Rong, San Jose, CA (US); Takeo Furukubo, Kobe (JP); Yinghung Lai, Santa Clara, CA (US); Wangzi He, Cupertino, CA (US); Dezhou Jiang, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 62 days.

(21) Appl. No.: 16/050,823

(22) Filed: Jul. 31, 2018

(65) Prior Publication Data
US 2020/0042068 A1   Feb. 6, 2020

(51) Int. Cl.
  *G06F 1/3287*   (2019.01)
  *G06F 1/3209*   (2019.01)
  *G06F 9/50*     (2006.01)
  *G06F 1/28*     (2006.01)

(52) U.S. Cl.
  CPC .......... *G06F 1/3209* (2013.01); *G06F 1/3287* (2013.01); *G06F 9/5094* (2013.01); *G06F 1/28* (2013.01); *G06F 9/5083* (2013.01)

(58) Field of Classification Search
  CPC .................................................. G06F 1/3287
  See application file for complete search history.

(56) References Cited

U.S. PATENT DOCUMENTS

| | | |
|---|---|---|
| 6,983,386 B2 | 1/2006 | Barr et al. |
| 6,986,069 B2 | 1/2006 | Oehler et al. |
| 7,058,828 B2 | 6/2006 | Barr et al. |
| 7,272,517 B1 | 9/2007 | Brey et al. |
| 7,380,147 B1 | 5/2008 | Sun |
| 7,418,608 B2 | 8/2008 | Kumar et al. |
| 8,046,600 B2 | 10/2011 | Holle et al. |
| 8,549,518 B1 | 10/2013 | Aron et al. |

(Continued)

OTHER PUBLICATIONS

Cano, Ignacio et al. "Curator: Self-Managing Storage for Enterprised Clusters"; University of Washington; published Mar. 2017; pp. all.

(Continued)

*Primary Examiner* — Raymond N Phan
(74) *Attorney, Agent, or Firm* — Dorsey & Whitney LLP (57) ABSTRACT

Managing power consumption of multiple computing node clusters of a computing rack system is described. An example system may include a plurality of computing node clusters each comprising a respective plurality of computing nodes, and a power management system. The power management system is configured to determine respective power budget rules associated with each of the plurality of computing node clusters based on a maximum power consumption limit, and to provide the respective power budget rules to an associated one of the plurality of computing node clusters. The power management system is further configured to receive respective power consumption data from each of the plurality of computing node clusters and to adjust the respective power budget rules associated with at least one of the plurality of computing node clusters based on the respective power consumption data associated with each of the plurality of computing node clusters.

25 Claims, 4 Drawing Sheets

(56) References Cited

U.S. PATENT DOCUMENTS

| | | |
|---|---|---|
| 8,595,515 B1 | 11/2013 | Weber et al. |
| 8,601,473 B1 | 12/2013 | Aron et al. |
| 8,627,123 B2 | 1/2014 | Jain et al. |
| 8,645,733 B2 | 2/2014 | Kansal et al. |
| 8,719,804 B2 | 5/2014 | Jain |
| 8,737,410 B2 | 5/2014 | Davis et al. |
| 8,850,130 B1 | 9/2014 | Aron et al. |
| 9,024,471 B2 | 5/2015 | Logvinov |
| 9,037,878 B2 | 5/2015 | Liu-shen |
| 9,753,520 B2 | 9/2017 | Bailey et al. |
| 9,772,677 B2 | 9/2017 | Eide et al. |
| 9,772,866 B1 | 9/2017 | Aron et al. |
| 2007/0067657 A1 | 3/2007 | Ranganathan et al. |
| 2008/0177424 A1 | 7/2008 | Wheeler |
| 2008/0301474 A1 | 12/2008 | Bussa et al. |
| 2009/0187776 A1 | 7/2009 | Baba et al. |
| 2011/0106326 A1 | 5/2011 | Anunobi et al. |
| 2011/0239010 A1 | 9/2011 | Jain et al. |
| 2014/0149760 A1* | 5/2014 | Drake .................. G06F 1/3234 713/320 |
| 2014/0195831 A1 | 7/2014 | Hamdi et al. |
| 2014/0380069 A1 | 12/2014 | Berke et al. |
| 2015/0137765 A1 | 5/2015 | Hansen et al. |
| 2016/0034012 A1* | 2/2016 | Sahu .................... G06F 1/3206 713/320 |
| 2016/0162018 A1 | 6/2016 | Rahardjo et al. |
| 2016/0179173 A1* | 6/2016 | Eastep ................. G06F 1/3206 713/320 |
| 2017/0075611 A1 | 3/2017 | Choi et al. |
| 2018/0173299 A1 | 6/2018 | Shah et al. |
| 2018/0374129 A1 | 12/2018 | Parikh |
| 2019/0050046 A1 | 2/2019 | Gupta et al. |
| 2019/0107880 A1 | 4/2019 | Jung |
| 2020/0019230 A1 | 1/2020 | Rong et al. |

OTHER PUBLICATIONS

U.S. Appl. No. 16/031,366 titled "Managing Power Consumptions of Multiple Computing Nodes in a Hyper-Converged Computing System", filed Jul. 10, 2018, pp. all.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

MANAGING POWER BUDGET OF MULTIPLE COMPUTING NODE CLUSTERS IN A COMPUTING RACK SYSTEM

TECHNICAL FIELD

This disclosure is related to power management systems. Examples of managing power consumption of multiple computing nodes in a hyper-converged computing system are described.

BACKGROUND

In hyper-converged computing systems, performance may be affected by available power available power. In some examples, power is provided to a server rack via one or more uninterrupted power system (UPS). Each UPS operates according to a power limit (e.g., controlled by a circuit breaker) such that total power consumption by the server rack is limited by power limit of the UPS. Because a server rack may have a variable number of operational computing node clusters, with consumption by each computing node cluster dynamically may dynamically change based on changes in operation. Due to this variability, operators may over-allocate the server rack power budget to improve performance, save rack room cost, equipment lease cost, etc., based on an assumption that all of the computing node clusters installed in the server rack will not reach the maximum power consumption simultaneously. However, in some examples, a power outage may occur when the power consumption of the server rack exceeds limits of a circuit breaker installed in the power distribution system. Power outages may prove expensive and limiting power consumption of a computing node cluster when additional power is available may reduce efficiency of the computing node cluster.

BRIEF DESCRIPTION OF THE DRAWINGS

FIG. 2 is a diagram of an example of a process implemented in a computing node in accordance with embodiments described herein.

DETAILED DESCRIPTIONS

Certain details are set forth herein to provide an understanding of described embodiments of technology. However, other examples may be practiced without various of these particular details to avoid unnecessarily obscuring the described embodiments. Other embodiments may be utilized, and other changes may be made, without departing from the spirit or scope of the subject matter presented here.

Figure 1:
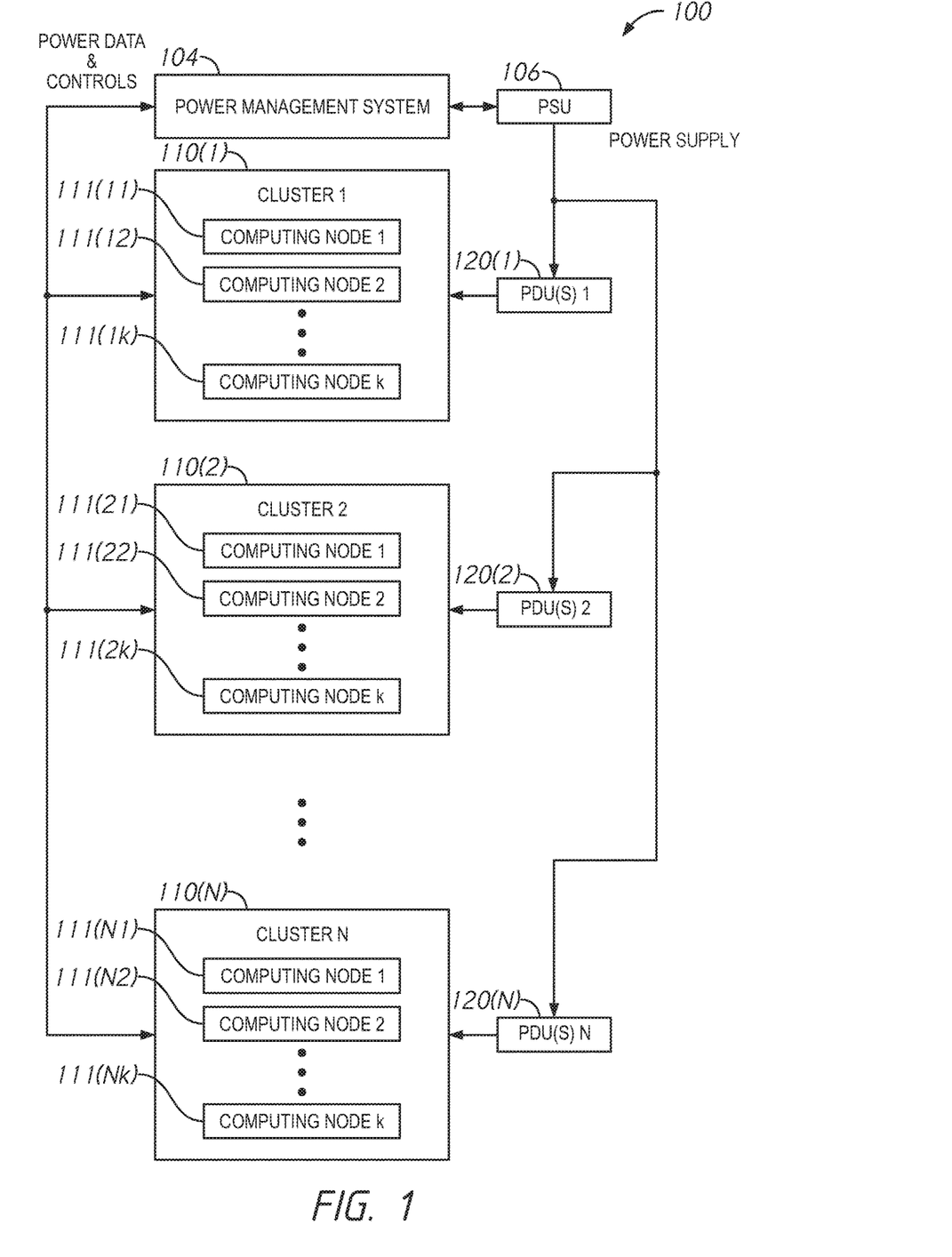
FIG. 1 is a block diagram of a computing system in accordance with embodiments described herein.

FIG. 1 is a block diagram of a computing rack system 100 in accordance with some embodiments of the disclosure. The computing rack system 100 may include a power management system 104, a power supply unit (PSU) 106, computing node clusters 110(1)-(N) and power distribution units 120(1)-(N). Each of the computing node clusters 110(1)-(N) may include respective computing nodes 111 (11)-(Nk).

Each of the computing nodes 111(11)-(Nk) may include a server, such as a web server, a database server, or an application server. Each of the computing nodes 111(11)-(Nk) may also include any computing device, for example, a server on the cloud, or a virtual machine. Each of the computing nodes 111(11)-(Nk) may be connected to respective PDUs 120(1)-(N) to receive power therefrom. While each of the computing nodes clusters 110(1)-(N) is shown with a common number of computing nodes 111(11)-(Nk), the number of computing nodes 111(11)-(Nk) may vary among the computing node clusters 110(1)-(N). The PDU(s) 120(1)-(N) may be connected to the PSU 106 to receive supplied. The PSU 106 may receive power from a UBS or some other external power source. In some scenarios, each of the PDU(s) 120(1)-(N) may have a maximum power consumption limit. The power limit may be defined in terms of watts, or may be derived from a maximum current, such as 24 amps. In some examples, the computing rack system 100 may implement power supply redundancy such that each of the PDU(s) 120(1)-(N) includes more than one separate PDU to allow a respective computing cluster 110 (1)-(N) to remain operational in the event of failure of one of the redundant PDUs. In examples with redundant PDUs, each PDU may be capable of some level of power to the respective computing node cluster 110(1)-(N) that is less than a maximum power possible consumption of the respective computing node cluster 110(1)-(N). For example, an individual PDU in a redundant PDU system may be capable of providing 50%-75% of the maximum power possible consumption of the respective computing node cluster 110 (1)-(N).

The power management system 104 may communicate with the computing node clusters 120(1)-(N) and the PSU 106 via a wired or wireless network. The power management system 104 may receive power consumption data from each of the computing node clusters 120(1)-(N) and may provide respective power budget limits to each of the computing node clusters 120(1)-(N). In some examples, the power management system 104 may be hosted on one of the computing nodes 111(11)-(Nk) as a service or application and may communicate over a local area network (LAN), an intranet network, or combinations thereof. In other examples, the power management system 104 may be hosted on a remote computing node and may be connected to the computing rack system 100 via a LAN, a wide area network (WAN), intranet, Internet, or combinations thereof. For example, one of the computing nodes 111(11)-(Nk) may include a master controller virtual machine (CVM) or hypervisor that acts as an administrator for the computing rack system 100. In some examples, the power management system 104 may also receive power consumption data from the 106 and/or from the PDU(s) 120(1)-(N).

In operation, the computing node clusters 120(1)-(N) may be operating contemporaneously and independently within the computing rack system 100. The computing rack system 100 may be configured to provide power to the computing node clusters 120(1)-(N) via the PSU and the PDU(s) 120(1)-(N). The PSU 106 may have an aggregate power consumption limit and each of the PDU(s) 120(1)-(N) may have a respective maximum power limit. The power limits of the PSU 106 and the PDU(s) 120(1)-(N) may be controlled or set via a circuit breaker, software, or some other control mechanism. The computing rack system 100 may be designed such that the aggregate power consumption limit of the PSU 106 is less than a sum of the power consumption limits of all of the PDU(s) 120(1)-(N) based on an assumption that all of the computing node clusters 110(1)-(N) would not be operating at full capacity contemporaneously.

The power management system 104 may receive power consumption data from each of the computing node clusters 110(1)-(N) and manage power consumption of the computing node clusters 110(1)-(N) based on the power consumption data. The management may include setting power budget rules for each of the computing nodes 111(11)-(Nk). A power budget rule may define a maximum amount of power allocated to the respective computing node 111(11)-(Nk) at a particular time. The power budget rules may be defined in terms of a maximum current of the computing node, such as 10 amps, or in terms of wattage, such as 1000 watts. In some examples, the power budget rules may be represented by one or more data blocks that are stored in a memory or storage of the respective computing node 111(11)-(Nk). For example, a power budget rule that has a power budget of 1000 watts may be represented by a 16-bit data block. The individual computing nodes 111(11)-(Nk) may use the respective power budget rules to control internal configuration and operation of the respective computing node, such as processor speeds, memory speeds, network throughput, active applications or services, etc. For example, each of the computing nodes 111(11)-(Nk) may host a power management service that is configured to receive and store a respective power budget rule from the power management system 104. In some examples, the aggregate of all of the power budget rule limits of the computing nodes 111(11)-(Nk) at a given time may exceed the maximum power consumption limit of the 106 based on an assumption that all of the computing nodes 111(11)-(Nk) would not be operating at full capacity contemporaneously.

In some examples, the power management system 104 may dynamically adjust the respective power budget rules for the computing nodes 111(11)-(Nk) of the computing node clusters 110(1)-(N) based on instantaneous consumption changes among the computing node clusters 110(1)-(N). In some examples, the power management system 104 may dynamically adjust the respective power budget rules for the computing nodes 111(11)-(Nk) of the computing node clusters 110(1)-(N) based on historical consumption patterns among the computing node clusters 110(1)-(N), such as based on a time of day or day of the week or some other criteria. In some examples, the power management system 104 may dynamically adjust the respective power budget rules for the computing nodes 111(11)-(Nk) of the computing node clusters 110(1)-(N) based on a cluster priority. Cluster priority may be time based, day based, fixed, or based on some other criteria. In some examples, the power management system 104 may dynamically adjust the respective power budget limits for the computing nodes 111(11)-(Nk) of the computing node clusters 110(1)-(N) in response to a failure of one of the PDU(s) 120(1)-(N). In some scenarios, the power budget rules for the computing nodes 111(11)-(Nk) of the computing node clusters 110(1)-(N) may correspond to the power consumption limit of the corresponding PDU(s) 120(1)-(N). For example, if the computing node cluster 110(1) has two associated PDUs 120(1), each with a power consumption limit of 24 amps, the aggregate power budget limits for the computing nodes 111(11)-(1k) may be set to 48 amps when both PDUs are active and 24 amps when only one PDU is active. In some examples, the aggregate power budget limits for the computing nodes 111(11)-(1k) may be greater than 48 amps or 24 amps in scenarios where it is assumed that the computing nodes 111(11)-(1k) would not operate at full capacity contemporaneously. The power management system 104 may also adjust power budget rules across the computing node clusters 110(1)-(N) when computing node clusters are added to (e.g., adjust power budget rules to reduce power budget limits for one or more of the computing nodes 111(11)-(1k) of one or more of the existing computing node clusters 10(1)-(N)) or removed from (e.g., adjust power budget rules to increase power budget limits for one or more of the computing nodes 111(11)-(1k) of one or more of the existing computing node clusters 110(1)-(N)) the computing rack system 100.

The power management service running on each of the computing nodes 111(11)-(1k) may also be configured to collect power consumption data to provide to the power management system 104. Each computing node may adjust respective power consumption by comparing the collected power consumption data with the power budget limit of the associated power budget rule. For example, the computing nodes 111(11)-(1k) may be coupled to a power meter that measures respective instant power consumption. The computing node may be configured to determine the instant power consumption and store the instant power consumption in a local storage. In some scenarios, the power meter may be configured to generate an analog signal that indicates the power consumption to which the power meter is coupled. In some scenarios, the power meter may be configured to convert the analog signal to a digital value that can be accessed and/or stored. The power management system 104 may assess instantaneous power consumption and/or power consumption patterns of the computing node clusters 120(1)-(N), and adjust the power budget rules associated with the computing node clusters 120(1)-(N) based in the assessed power consumption. The power management system 104 may further provide the updated power budget rules to the respective computing nodes 111(11)-(1k).

Figure 2:
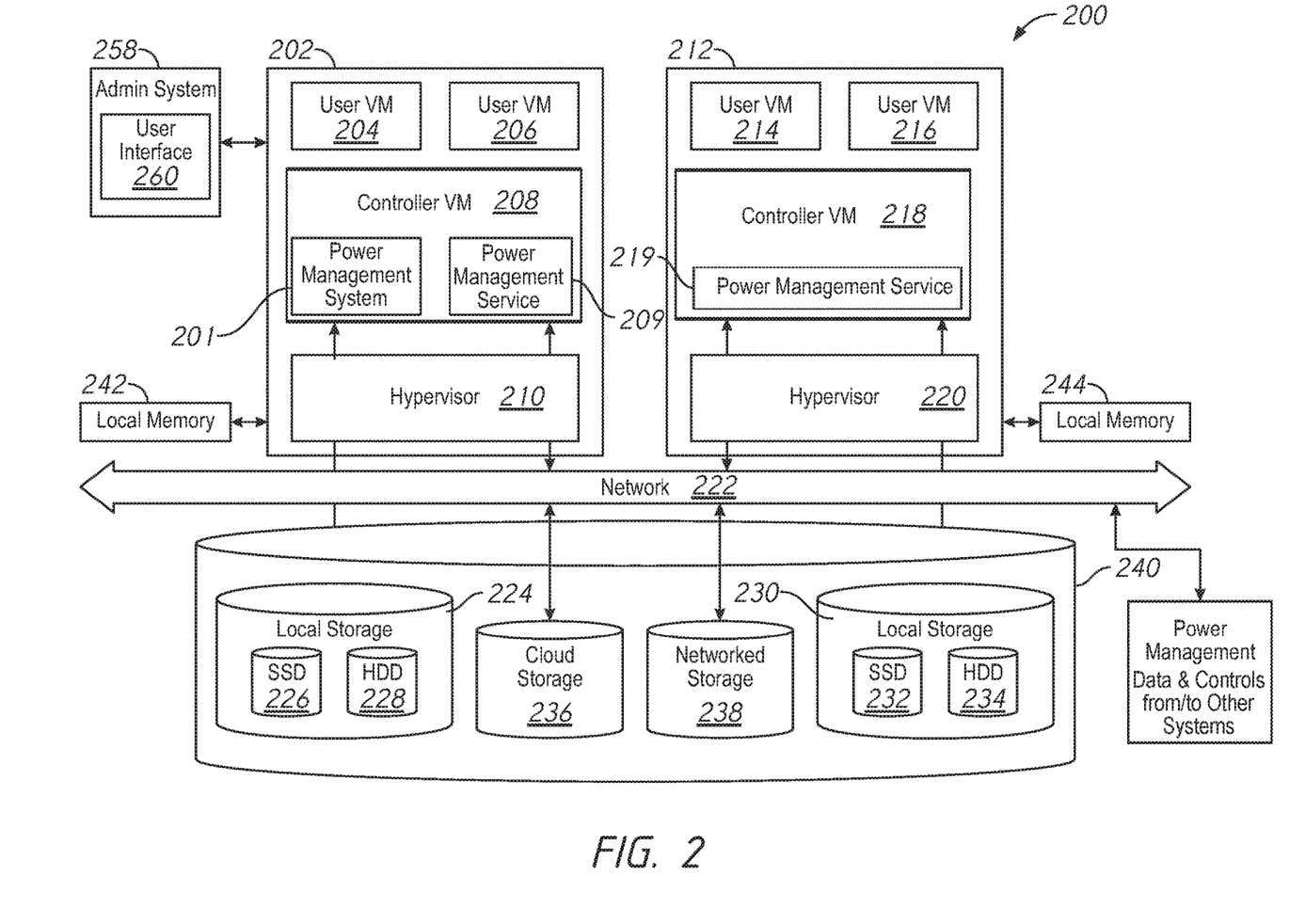
FIG. 2 is a block diagram of a hyper-converged computing system implementing various embodiments in accordance with embodiments described herein.

FIG. 2 is a block diagram of a hyper-converged computing system 200 implementing various embodiments in accordance with embodiments described herein. The hyper-converged computing system 200 may be implemented in any of the computing node clusters 110(1)-(N) of FIG. 1. The hyper-converged computing system 200 may include multiple computing nodes 202, 212, and storage 240, all of which may be in communication with a network 222. The network 222 may be any type of network capable of routing data transmissions from one network device (e.g., computing node 202, computing node 212, and storage 240) to another. The network 222 may include wired or wireless communication links.

The storage 240 may include local storage 224, local storage 230, cloud storage 236, and networked storage 238. The local storage 224 may include, for example, one or more solid state drives (SSD 226) and one or more hard disk drives (HDD 228). Similarly, the local storage 230 may include SSD 232 and HDD 234. The local storage 224 and the local storage 230 may be directly coupled to, included in, and/or accessible by a respective computing node 202 and/or computing node 212 without communicating via the network 222. Other nodes, however, may access the local storage 224 and/or the local storage 230 using the network 222. The cloud storage 236 may include one or more storage servers that may be stored remotely to the computing node 202 and/or computing node 212 and accessed via the network 222. The cloud storage 236 may generally include any suitable type of storage device, such as HDDs SSDs, or optical drives. The networked storage 238 may include one or more storage devices coupled to and accessed via the network 222. The networked storage 238 may generally include any suitable type of storage device, such as HDDs SSDs, and/or NVM Express (NVMe). In various examples, the networked storage 238 may be a storage area network (SAN). Any storage in the storage 240 may contain power management data, which includes various data that may be accessed by a power management system 201. In some examples, the power management data may include block(s) of data representing respective power budgets rules and power consumption data for each of the computing nodes 202, 212, as well as power consumption rules and power consumption data from other computing node clusters within a computing rack system, such as the computing rack system 100 of FIG. 1. The power consumption data may be used by the power management system 201 to adjust respective power budget rules for each of the computing node 202, 212.

The computing nodes 202, 212 may include, for example, a server, such as a server in data center. In some examples, the computing node 202, 212 may include a computing device for hosting virtual machines (VMs). For example, the computing node 202 may be configured to execute a hypervisor 210, a controller VM (CVM) 208 and one or more user VMs, such as user VMs 204, 206. The computing node 212 may be configured to execute a hypervisor 220, a controller VM (CVM) 218 and one or more user VMs, such as user VMs 214, 216. The user VMs 204, 206, 214, 216, are virtual machine instances executing on the computing nodes 202, 212, respectively. The user VMs 204, 206, 214, 216 may share a virtualized pool of physical computing resources such as physical processors and storage (e.g., storage 240). The user VMs 204, 206, 214, 216 may each have their own operating system, such as Windows or Linux. While a certain number of user VMs are shown, generally any suitable number may be implemented. User VMs may generally be provided to execute any number of applications which may be desired by a user.

The CVMs 208, CVM 218, which may provide services for the respective user VMs 204, 206, 214, 216 of the computing nodes. The CVMs 208, 218 may each execute a variety of services and may coordinate, for example, through communication over the network 222. In some examples, the CVM 208 and the CVM 218 may communicate with one another via the network 222. Services running on the CVMs 208, 218 may utilize an amount of local memory 240 to support their operations. For example, services running on CVM 208 may utilize memory in local memory 242. Services running on CVM 218 may utilize memory in local memory 244. The local memory 242 and local memory 244 may be shared by VMs on computing node 202 and computing node 212, respectively, and the use of local memory 242 and/or local memory 244 may be controlled by the hypervisor 210 and the hypervisor 220, respectively. Moreover, multiple instances of the same service may be running throughout the hyper-converged computing system 200, e.g., a same services stack may be operating on each controller VM. For example, an instance of a service may be running on CVM 208 and a second instance of the service may be running on CVM 218.

The hypervisors 210, 220 may implement certain functions performed in computing nodes 202, 212. The hypervisors 210, 220 may be of any suitable type of hypervisor. For example, hypervisors 210, 220 may be ESX, ESX(i), Hyper-V, KVM, or any other type of hypervisor. The hypervisors 210, 220 may be the same, or may be different from each other. The hypervisors 210, 220 may manage the allocation of physical resources (such as storage 240 and physical processors) to VMs (e.g., user VMs 204, 206, and CVM 208 or user VMs 214, 216, and CVM 218, respectively) and perform various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

The hypervisors 210, 220 may communicate with the CVMs 208, 218 using Internet protocol (IP) requests. In some examples, the CVM 208 and the hypervisor 210 may each implement certain functions. While FIG. 2 depicts the power management system 201 and the power management service running on the CVM 208, one or both of the power management system 201 and the power management service may run on the hypervisor 210. The computing node 212 may have a similar structure as that in computing node 202.

Note that CVMs 208, 218 are provided as virtual machines utilizing the hypervisors 210, 220. The CVMs 208, 218 that run "above" the hypervisors 210, 220 in the examples described herein may be implemented within any virtual machine architecture, since the CVMs 208, 218 may be used in conjunction with generally any hypervisor from any virtualization vendor.

In some examples, the CVM 208 may be configured to host the power management system 201. The power management system 201 is configured to monitor and manage power consumption across multiple hyper-converged computing systems, including the hyper-converged computing system 200, within a computing rack system (e.g., such as the computing rack system 100 of FIG. 1) in accordance with aggregate power consumption limits of the computing rack system. Thus, the power management system 201 may receive power consumption data from each of the hyper-converged computing systems and manage power consumption of the hyper-converged computing systems based on the power consumption data. The power management system 201 may also communicate the computing nodes of each of the hyper-converged computing systems, including the computing nodes 202, 212 of the hyper-converged computing system 200, via a communication link, such as the network 222. In some examples, the power management system 201 may also communicate with certain components of a computing node, such as the power management service 209, 219 of the CVM 208, 218. In some scenarios, the power management service 209, 219 may be configured to transmit certain power consumption data associated with that computing node 202, 212 to the power management system 201. The power management system 201 may also adjust power budget rules across the hyper-converged computing systems (e.g., including the hyper-converged computing system 200) when the hyper-converged computing systems are added to (e.g., adjust power budget rules to reduce power budget limits for one or more of the computing nodes of one or more of the existing the hyper-converged computing systems or removed from (e.g., adjust power budget rules to increase power budget limits for one or more of the computing nodes of one or more of the existing the hyper-converged computing systems) the computing rack system.

The management by the power management system 201 may include setting power budget rules for each of the computing nodes of the hyper-converged computing systems, including the computing nodes 202, 212 of the hyper-converged computing system 200. A power budget rule may define a maximum amount of power allocated to the respective computing node at a particular time. The power budget rules may be defined in terms of a maximum current of the computing node, such as 10 amps, or in terms of wattage, such as 1000 watts. In some examples, the power budget rules may be represented by one or more data blocks that are stored in a memory or storage of the respective computing node (e.g., anywhere within the storage 240). For example, a power budget rule that has a power budget of 1000 watts may be represented by a 16-bit data block. The individual computing nodes, including the computing nodes 202, 212 may use the respective power budget rules to control internal configuration and operation of the respective computing node, such as processor speeds, memory speeds, network throughput, active applications or services, etc.

In determining the power budget rule, the power management system 201 may determine an initial power budget rule for all of the computing nodes of the hyper-converged systems, including the computing nodes 202, 212 of the hyper-converged system 200. For example, the initial power budget rule may include an initial power budget based on the maximum power of a corresponding PSU. In some scenarios, the initial power budget may be the maximum power of the PSU divided by the number hyper-converged systems or a number of computing nodes that are connected to the PSU. As not all computing nodes may reach its respective power budget at the same time, the power management system 201 may set the initial power budget for each computing node slightly higher, for example, by increasing the initial power budget limit for each computing node such that the aggregate total is some amount (e.g., 10%, 20%, 30%, etc.) over the power limit of the PSU. In some examples, the power management system 201 may determine the power budget rules for each respective computing node of the hyper-converged computing systems based on a respective power model of the respective computing node. The power model of each computing node may be obtained using machine learning or some other training technique. The power model may also be provided to the power management system 201.

In some examples, the power management system 201 may dynamically adjust the respective power budget rules for the computing nodes 202, 212 based on instantaneous consumption changes across all of the hyper-converged computing systems. For example, the power management system 201 may assess the power consumption of all of the hyper-converged computing systems, and update the respective power budget rules for computing nodes of the hyper-converged computing systems based on the assessment. The power management system 201 may determine whether the power consumptions among the multiple hyper-converged computing systems that share the PSU are properly balanced. The assessment may include determining a usage ratio, which is a ratio of actual consumed power relative to the power budget limit for the computing node. In some scenarios, a first hyper-converged computing system consume more power consumption than a second hyper-converged computing system. In this example, the power management system 201 may be configured to increase budget limits of the power budget rules associated with computing nodes of the first hyper-converged computing system and decrease budget limits of the power budget rules associated with computing nodes of the second hyper-converged computing system.

In some examples, the amount of increase or decrease may be based on the usage ration (e.g., based on how close the power consumption is to the power budget limit or to a current operating power consumption). The amount of increase may be disproportional to the usage ratio. For example, if the respective usage ration is 90%, the power management system 201 may determine to increase the power budget by 10%. If the power consumption has reached a 95% usage ratio, the power management system 201 may increase the power budget by 15% if the power consumption has reached an 85% usage ratio, the power management system 201 may increase the power budget by 5%, etc. The power management system 201 may also monitor aggregate increases relative to the maximum power consumption limit of the PSU.

In some examples, the power management system 201 may also determine that certain hyper-converged computing systems are underutilizing the allocated power budgets, such that the respective power consumption for the associated computing nodes is below the respective power budget limit. For example, when the power consumption of a hyper-converged computing system is at 60%, 50% or lower the allocated power budget, the power management system 201 may decrease the power budgets for computing nodes of these hyper-converged computing systems by an amount. For example, the decrease amount may be determined based on the usage ratio (e.g., based on how much these hyper-converged computing systems are underutilizing their aggregate power budgets) and determine the decrease amount in proportion to the usage ratio. In an example, if the power consumption of a hyper-converged computing system has reached a 50% usage ratio, the power management system 201 may determine to decrease the power budget of the computing nodes of that hyper-converged computing system by 20%. If the power consumption has reached a 40% usage ratio, the power management system 201 may decrease the assigned aggregate power budget limit by 30%, if the power consumption has reached a 60% usage ratio, the power management system may decrease the power budget by 10%, etc.

The power management system 201 may also track a total power budget decrease among the underutilized hyper-converged computing systems and a total power budget increase among the high-use hyper-converged computing systems to determine available margin for allocating power budget increases to other hyper-converged computing systems. Prior to making any budget changes, the power management system 201 may evaluate a proposed aggregated increase amount against a proposed aggregated decrease amount and determine whether the increase amount in power budgets is offset by the decrease amount. For example, if the aggregated increase amount in the power budgets is totaled 500 watts and the aggregated decrease amount is less than the aggregated increase amount, e.g., 600 watts, then the power management system 201 may update the power budgets by the increase or decrease amount for certain hyper-converged computing systems. In another example, if the aggregated increase amount in the power budgets is less than the aggregated decrease amount, the power management system 201 may re-allocate the power budgets among the high-use hyper-converged computing systems to cover the deficiency.

In some examples, the power management system 201 may dynamically adjust the respective power budget rules for the computing nodes of the hyper-converged computing systems, including the computing nodes 202, 212, based on historical consumption patterns among the hyper-converged computing systems and/or historical consumption patterns of the hyper-converged computing system 200, such as based on a time of day or day of the week or some other criteria. In some examples, the power management system 201 may dynamically adjust the respective power budget rules for the computing nodes 202, 212 based on hyper-converged computing system priority. Cluster priority may be time based, day based, fixed, or based on some other criteria. In some examples, the power management system 201 may dynamically adjust the respective power budget limits for the computing nodes 202, 212 in response to a failure of a PDU(s) coupled to the hyper-converged computing system 200, or failure of a PDU coupled to another of the hyper-converged computing systems. In some scenarios, the power budget rules for the computing nodes 202, 212 may correspond to the power consumption limit of a corresponding PDU(s).

In some examples, the power management system 201 may communicate with each hyper-converged computing system to receive a workload priority. In some scenarios, the priorities of workloads for each of the hyper-converged computing systems may be known in advance. The power management system 201 may update the power budget rules based on the priorities of the workloads in of the hyper-converged computing systems. For example, the priority of workloads on a first hyper-converged computing system may be higher than that on a second hyper-converged computing system. In such case, the power management system 201 may adjust the power budget rules for the computing nodes of the first hyper-converged computing system to be higher than that for the computing nodes of the second hyper-converged computing system As a result, the higher priority workloads on the first hyper-converged computing system may be more likely and/or guaranteed to run at full power consumption mode. On the other hand, the hyper-converged computing system that do not have higher priority workloads may give away power budget to higher priority workloads on other hyper-converged computing systems.

In some scenarios, the priority of workloads may be represented by one or more data values. For example, the priority of workloads for a hyper-converged computing system may include a single value data. In one example, the higher the value the higher the priority is. In some scenarios, the power management system 201 may update the power budget for a hyper-converged computing system based on the priorities of workloads. The power management system 201 may also update power budget rules based on a combination of priorities of workloads and other factors. For example, the power management system 201 may update power budgets for certain hyper-converged computing systems based on a combination of power consumptions and priorities of workloads for those hyper-converged computing systems. For example, when the power management system 201 determines that the power consumption for a hyper-converged computing system is approaching its power budget, the power management system 201 may determine the increase amount in the power budget based on the priority of workloads in that hyper-converged computing system. For example, if the priority of workloads for a hyper-converged computing system has a high value, the power management system 201 may set the increase amount at a higher value so that the computing nodes of that hyper-converged computing system will be less likely to hit the power budget. On the other hand, if the priority of workloads for a hyper-converged computing system has a low value, the power management system 201 may set the increase amount for that computing nodes of the hyper-converged computing system to a lower value.

The power management system 201 may determine the actual computation loads of one or more computing nodes of the hyper-converged computing systems and update the power budget rule(s) for the one or more computing nodes based on the actual computation loads. In some examples, the power management system 201 may determine the computation load associated with a computing node (e.g., the computing node 202, 212) via an IO peripheral of the computing node by monitoring the data flow in the IO peripheral. In other examples, the power management system 201 may communicate with each computing node to receive the computation load associated with that computing node. In updating the power budget rule(s), the power management system 201 may adjust the power budget rule for the computing node with higher computation loads by increasing the power budget for that node. Alternatively, the power management system 201 may adjust the power budget for the computing node with lower computation loads by decreasing the power budget for that computing node.

To receive, monitor, and manage power consumption at each computing node of the hyper-converged computing systems, including the hyper-converged computing system 200, the computing nodes may host a power management service. That, each of the CVMs 208, 218 may be configured to host a respective power management service 209, 219. The respective power management services 209, 219 may be configured to manage collection, storage and transmission of the power consumption data to the power management system 201. In other examples, the hypervisor 210 may host the power management system 201 and/or the hypervisors 210, 220 may host the power management services 209, 219, respectively.

The respective power management services 209, 219 may also be configured to receive the respective power budget rule corresponding to the respective computing node 202, 212 from the power management system 201 and to manage configuration of the respective computing node 202, 212 to comply with the corresponding power budget rule. The power management services 209, 219 may determine an instant power consumption of the respective computing node 202, 212, and compare the instant power consumption with the power budget of the respective power budget rule. If the difference between the respective instant power consumption and the respective power budget has met the criteria, the respective computing node 202, 212 may adjust the power consumption. For example, the computing node 202, 212 may each include one or more processor units. The power management service 209 running on the CVM 208 may communicate with the one or more processor units of the computing node 202 to cause the one or more processor units to operate at a power state that corresponds to the corresponding power budget rule, such as operating in a state that results in higher or lower power consumption. The respective one or more processor units of the computing nodes 202, 212 may operate at a core executing state (e.g., C0), in which the core is executing instructions. When the power consumption of the computing nodes 202, 212 approach the respective power budget limit defined in the power budget rule, the power management services 209, 219 may cause the one or more processor units to operate at a power conserving state (e.g., p-state). In some or other examples, the one or more processor units may operate at various power conserving states from conserving state to more extensive conserving state, e.g., from C1 to C2 to C6. In some examples, the power management services 209, 219 may communicate with the VMs 204, 206, 214, 216 to cause the respective one or more processor units of the computing nodes 202, 212 to operate at a lower or higher power consumption state. In an example, the power management services 209, 219 (via the CVM 208, 218 and/or the hypervisor 210, 220) may communicate with the one or more processor units via a firmware, e.g., basic input and output system (BIOS) of the operating system on the respective computer node 202, 212. In another example, the power management services 209, 219 (via the CVM 208, 218 and/or the hypervisor 210, 220) may communicate directly with the processor via an interface, e.g., ACPI.

In some examples, the CVMs 208, 218 may provide a variety of services (e.g., may include computer-executable instructions for providing services). While FIG. 2 depicts a power management service 209, 219 on each of the computing nodes 202, 212, a single power management service may be implemented to manage power consumption for multiple computing nodes. In some examples, one instance of the power management service (e.g., power management service 209 or 219) may serve as a "master" service and may provide coordination and/or management of other power management services across the hyper-converged computing system 100. For example, the power management service 209 associated with the CVM 208 of the computing node 202 may receive power budget rules associated with the computing node 202 and/or, additionally, the power budget rule associated with the computing node 212. The power management service 209 may communicate the corresponding power budget rules to the power management service 219 associated with the CVM 218 of the computing node 212. As power manage services may be implemented in a hypervisor or a CVM, the hypervisor 210, 220 may communicate with the respective CVM 208, 218 using Internet protocol (IP) requests. A hypervisor in one computing node may also communicate with other hypervisors in other computing nodes via the network 222.

The hyper-converged computing system 200 may further include an administrator system 258. The administrator system 258 may be implemented using, for example, one or more computers, servers, laptops, desktops, tablets, mobile phones, or other computing systems. In some examples, the administrator system 258 may be wholly and/or partially implemented using one of the computing nodes 202, 212 of a hyper-converged computing system 200. However, in some examples, the administrator system 258 may be a different computing system from the virtualized system and may be in communication with a CVM of the virtualized system (e.g., the CVM 208) using a wired or wireless connection (e.g., over the network 222).

The administrator system 258 may host one or more user interfaces, e.g., such as user interface 260. The user interface 260 may be implemented, for example, by displaying a user interface on a display of the administrator system 258. The user interface 260 may receive input from one or more users (e.g., administrators) using one or more input device(s) of the administrator system 258, such as, but not limited to, a keyboard, mouse, touchscreen, and/or voice input. The user interface 260 may provide input to CVM 208 and/or may receive data from the CVM 208. For example, a user may set the priority of workload in a computing node by transmitting a value that indicates the priority of workload to the CVM residing in that computing node. The user interface 260 may be implemented, for example, using a web service provided by the CVM 208 or one or more other CVMs described herein. In some examples, the user interface 260 may be implemented using a web service provided by CVM 208 and information from CVM 208 (e.g., from power management service 248) may be provided to admin system 258 for display in the user interface 260.

Figure 3:
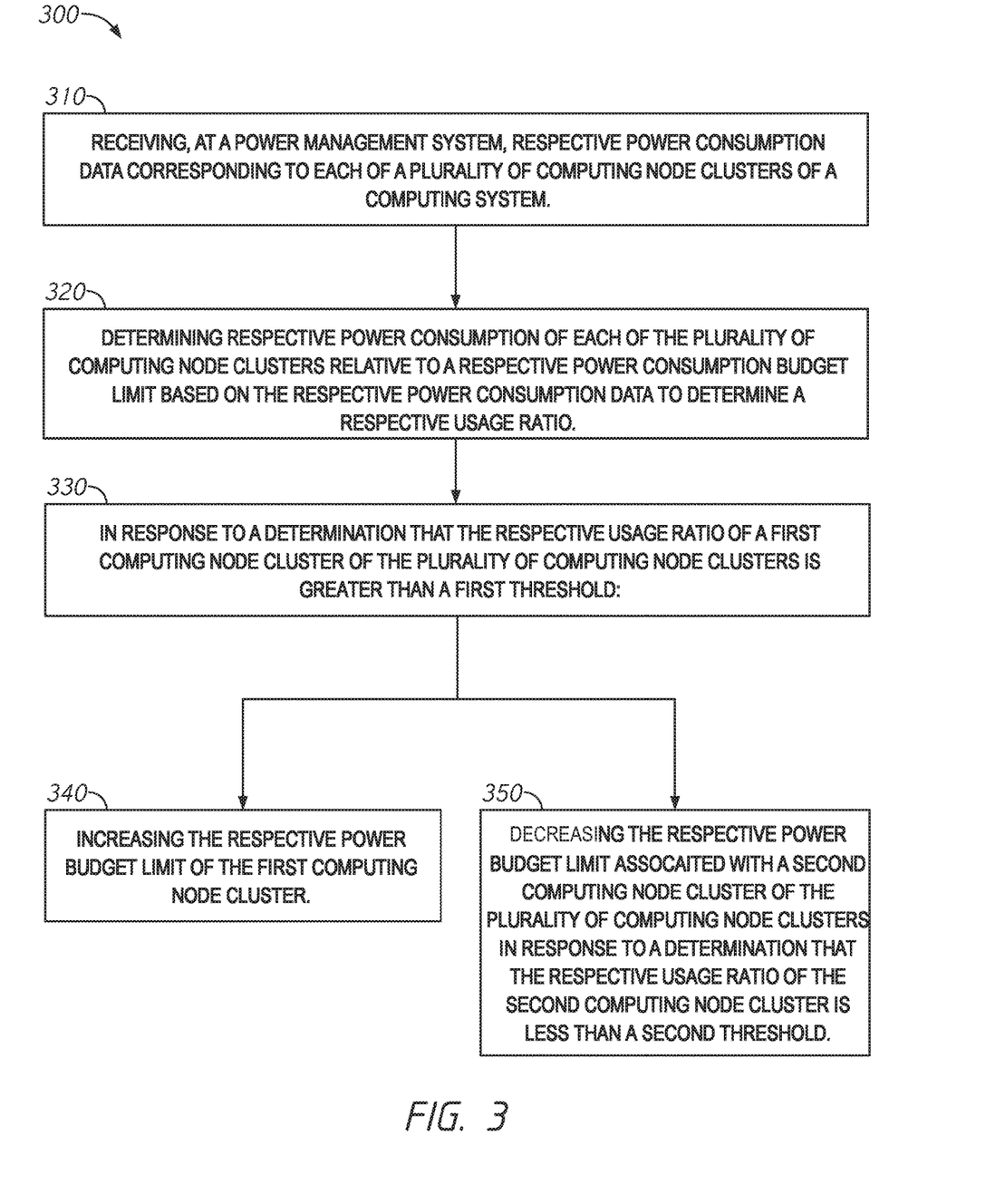
FIG. 3 is a flow diagram of method for managing power in across multiple computing node clusters in a computing rack system in accordance with embodiments described herein.

FIG. 3 is a flow diagram of method for managing power in across multiple computing node clusters in a computing rack system in accordance with embodiments described herein. The method 300 may be performed by the computing rack system 100 of FIG. 1, the hyper-converged computing system 200 of FIG. 2, or combinations thereof.

The method 300 may include receiving, at a power management system, respective power consumption data corresponding to each of a plurality of computing node clusters of a computing rack system, at 310. The power management system may include the power management system 104 of FIG. 1 and/or the power management system 201 of FIG. 1. The plurality of computing node clusters may include the computing node clusters 110(1)-(N) of FIG. 1 and/or the hyper-converged computing system 200 of FIG. 2. The power consumption data may be provided from a power management service, such as the power management services 209 or 219 of FIG. 2.

The method 300 may further include determining respective power consumption of each of the plurality of computing node clusters relative to a respective power consumption budget limit based on the respective power consumption data to determine a respective usage ratio, at 320. The respective power budget limit may be included in a respective power budget rule associated with each computing node of a computing node cluster.

The method 300 may father include, in response to a determination that the respective usage ratio of a first computing node cluster of the plurality of computing node clusters is less than a first threshold, at 330; increasing the respective power budget limit of the first computing node cluster, at 340, and decreasing the respective power budget limit associated with a second computing node cluster of the plurality of computing node clusters in response to a determination that the respective usage ratio of the second computing node cluster is less than a second threshold, at 350. The first threshold may be greater than the second threshold. In some examples, the method 300 may further include, in response to the increase of the respective power budget limit of the first computing node cluster exceeding the decrease of the respective power budget limit of the second computing node cluster, decreasing the respective power budget limit associated with a third computing node cluster of the plurality of computing node clusters in response to a determination that the respective usage ratio of the third computing node cluster is less than the second threshold.

In some examples, the method 300 may further include, prior to increasing the respective power budget limit associated with the first computing node cluster and decreasing the respective power budget limit associated with the second computing node cluster, determining whether increasing the respective power budget limit associated with the fist computing node cluster in aggregate with all existing respective power budget limits associated with the other computing node clusters of the plurality of computing node clusters exceeds a maximum power consumption threshold, and reducing the increase of the respective power budget limit associated with the fist computing node from a first amount to a second amount in response to a determination that the increase of the first amount in aggregate with all existing respective power budget limits associated with the other computing node clusters of the plurality of computing node clusters exceeds the maximum power consumption threshold.

The increase of respective power budget limit of the first computing node cluster may be by a first amount. The method 300 may further include increasing the respective power budget limit of the first computing node cluster by a second amount in response to a determination that the respective usage ratio of the first computing node cluster is greater than a third threshold that is greater than the first threshold. In some examples, the amount of increase may be disproportional to the usage ratio. For example, if the respective usage ratio is above a 90% threshold, the power budget limit may be increased by 10%. If the power consumption has reached a 95% usage ratio, the power budget limit may be increased by 15%; if the power consumption has reached an 85% usage ratio, the power budget limit may be increased by 5%, etc.

The decrease of respective power budget limit of the second computing node cluster may be by a first amount. The method 300 may further include decreasing the respective power budget limit of the second computing node cluster by a second amount in response to a determination that the respective usage ratio of the second computing node cluster is less than a fourth threshold that is less than the second threshold. In an example, if the usage ratio has reached a 50%, the power budget limit of the second computing node cluster may be reduced by 20%. If the power consumption has reached a 40% usage ratio, the power budget limit may be decreased by 30%; if the power consumption has reached a 60% usage ratio, the power budget limit may be reduced by 10%, etc.

Figure 4:
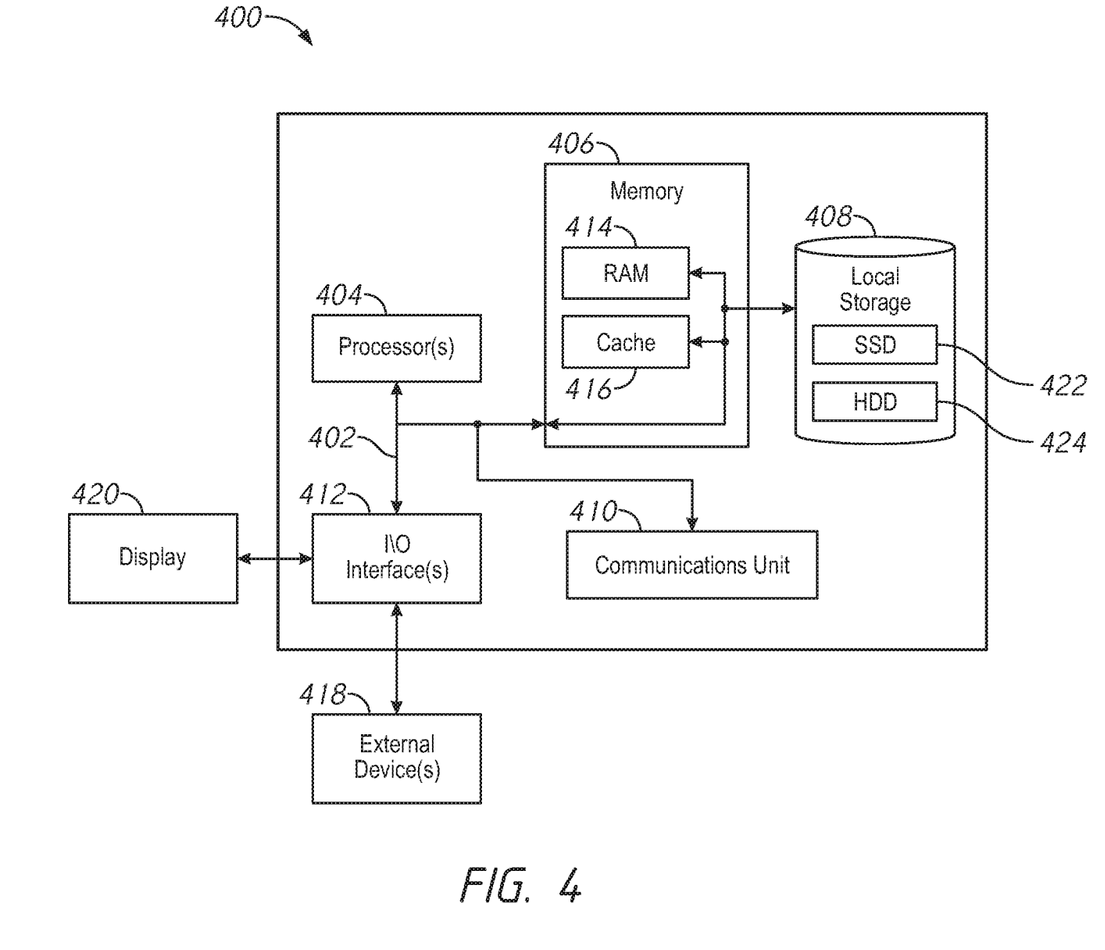
FIG. 4 is a block diagram of components of a computing node in accordance with embodiments described herein.

FIG. 4 is a block diagram of components of a computing node 400 in accordance with embodiments described herein. Any of the computing nodes 111(11)-(Nk) and/or the power management system 104 of FIG. 1, any of the computing nodes 202, 212, or combinations thereof, may implement the computing node 400. The computing node 400 may be configured to implement at least some of the method 300 of FIG. 3, in some examples. It should be appreciated that FIG. 4 provides only an illustration of one implementation and does not imply any limitations with regard to the environments in which different embodiments may be implemented. Many modifications to the depicted environment may be made.

The computing node 400 may include a communications fabric 402, which provides communications between one or more processor(s) 404, memory 406, local storage 408, communications unit 410, I/O interface(s) 412. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses.

The memory 406 and the local storage 408 are computer-readable storage media. In this embodiment, the memory 406 includes random access memory RAM 414 and cache 416. In general, the memory 406 can include any suitable volatile or non-volatile computer-readable storage media. The local storage 408 may be implemented as described above with respect to local storage 224 and/or local storage 230 of FIG. 2, in some examples. In this embodiment, the local storage 408 includes an SSD 422 and an HDD 424, which may be implemented as described above with respect to SSD 226, SSD 232 and HDD 228, HDD 234, respectively, of FIG. 2.

Various computer instructions, programs, files, images, etc. may be stored in local storage 408 for execution by one or more of the respective processor(s) 404 via one or more memories of memory 406. In some examples, local storage 408 includes a magnetic HDD 424. Alternatively, or in addition to a magnetic hard disk drive, local storage 408 may include the SSD 422, a semiconductor storage device, a read-only memory (ROM), an erasable programmable read-only memory (EPROM), a flash memory, or any other computer-readable storage media that is capable of storing program instructions or digital information.

The media used by local storage 408 may also be removable. For example, a removable hard drive may be used for local storage 408. Other examples include optical and magnetic disks, thumb drives, and smart cards that are inserted into a drive for transfer onto another computer-readable storage medium that is also part of local storage 408.

Communications unit 410, in these examples, provides for communications with other data processing systems or devices. In these examples, communications unit 410 includes one or more network interface cards. Communications unit 410 may provide communications through the use of either or both physical and wireless communications links.

I/O interface(s) 412 allows for input and output of data with other devices that may be connected to the computing node 400. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention can be stored on such portable computer-readable storage media and can be loaded onto local storage 408 via I/O interface(s) 412. I/O interface(s) 412 also connect to a display 420. Display 420 provides a mechanism to display data to a user and may be, for example, a computer monitor.

From the foregoing it will be appreciated that, although specific embodiments have been described herein for purposes of illustration, various modifications may be made while remaining with the scope of the claimed technology. Further, various embodiments disclosed herein with reference to FIGS. 1-4 provide advantages in multiple ways. For example, by the power management system updating the power budget rules, the computing rack system and associated computing node clusters may operate more efficiently as underutilized resources may be reduced.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system comprising:
a plurality of computing node clusters each comprising a respective plurality of computing nodes; and
a power management system executed on a processor configured to determine respective power budget rules for the respective plurality of computing nodes associated with each of the plurality of computing node clusters based on a maximum power consumption limit, wherein the power management system is further configured to provide the respective power budget rules to an associated one of the plurality of computing node clusters;
wherein the power management system is further configured to receive respective power consumption data from each of the plurality of computing node clusters and to adjust the respective power budget rules for the respective plurality of computing nodes associated with at least one of the plurality of computing node clusters based on the respective power consumption data associated with each of the plurality of computing node clusters.

2. The system of claim 1, wherein the power management system is configured to adjust a power budget limit of the respective power budget rule for the respective plurality of computing nodes associated with at least one of the plurality of computing node clusters in response to installation of an additional computing node cluster in the computing rack system.

3. The system of claim 1, wherein the power management system is configured to increase a power budget limit of the respective power budget rule for the respective plurality of computing nodes associated with the at least one of the plurality of computing node clusters in response to installation of an additional computing node cluster in the computing rack system.

4. The system of claim 1, wherein the power management system is configured to adjust a power budget limit of the respective power budget rule for the respective plurality of computing nodes associated with at least one of the plurality of computing node clusters in response to removal of one of the plurality of computing node clusters from the computing rack system.

5. The system of claim 1, wherein the power management system is configured to decrease a power budget limit of the respective power budget rule for the respective plurality of computing nodes associated with the at least one of the plurality of computing node clusters in response to removal of one of the plurality of computing node clusters from the computing rack system.

6. The system of claim 1, further comprising a power supply unit configured to provide a power to the plurality of computing node clusters, wherein an aggregate power provided by the power supply unit is the maximum power consumption limit.

7. The system of claim 1, wherein the power management system is further configured to assess individual power consumption of the plurality of computing node clusters relative to the respective power budget rules to determine a usage ratio and to decrease power budget limits of the respective power budget rules for the respective plurality of computing nodes associated with a first one of the plurality of computing node clusters in response to the usage ratio of the first one of the plurality of computing node clusters being less than a threshold.

8. The system of claim 1, wherein the power management system is further configured to assess individual power consumption of the plurality of computing node clusters relative to the respective power budget rules to determine a usage ratio and to increase power budget limits of the respective power budget rules for the respective plurality of computing nodes associated with a second one of the plurality of computing node clusters in response to the usage ratio of the second one of the plurality of computing node clusters being greater than a threshold.

9. The system of claim 1, wherein the processor configured to execute the power management system is a processor of a computing node of the respective plurality of computing nodes of one of the plurality of computing node clusters.

10. The system of claim 6, further comprising a plurality of power distribution units, wherein a power distribution unit of the plurality of power distribution units is configured to receive power from the power supply unit and to provide power to one of the computing node clusters.

11. The system of claim 8, wherein the power management system is further configured to, prior to increasing power budget limits of the respective power budget rules associated with the second one of the plurality of computing node clusters, when a net power budget limit change between increase and decrease is a power limit increase, determining whether the increase, when added to all other respective power budget rule limits, exceeds the maximum power consumption threshold.

12. A non-transitory computer readable medium comprising instructions that when executed on one or more processor units, cause the one or more processor units to:
   receive respective power consumption data from each of a plurality of computing node clusters of a computing rack system;
   assess a respective usage ratio for each of the plurality of computing node clusters based on the respective power consumption data;
   determine a power budget limit increase of respective power budget rules for a respective plurality of computing nodes associated with a first computing node cluster of the plurality of computing node clusters based on the respective usage ratio;
   determine a power budget limit decrease of respective power budget rules for a respective plurality of computing nodes associated with a second computing node cluster of the plurality of computing node clusters based on the respective usage ratio;
   determine whether the power budget limit increase combined with the power budget limit decrease is a net power budget limit increase; and
   in response to a determination that the power budget limit increase combined with the power budget limit decrease is a net budget power limit decrease, provide the power budget limit increase of the respective power budget rules, for the respective plurality of computing nodes associated with the first computing node cluster to the first computing node cluster and the power budget limit decrease of the respective power budget rules for the respective plurality of computing nodes associated with the second computing node cluster to the second computing node cluster.

13. The non-transitory computer readable medium of claim 12, further comprising instructions that when executed on one or more processor units, cause the one or more processor units to, in response to a determination that the power budget limit increase combined with the power budget limit decrease is a net budget power limit increase:
   determine whether the net power budget limit increase added to existing power budget limits of each of the plurality of computing node clusters will exceed a maximum power consumption limit of the computing rack system; and
   in response to a determination that the net power budget limit increase added to the existing power budget limits of each of the plurality of computing node clusters will exceed the maximum power consumption limit of the computing rack system, reduce the power budget limit increase.

14. The non-transitory computer readable medium of claim 12, further comprising instructions that when executed on one or more processor units, cause the one or more processor units to increase a power budget limit of respective power budget rules for a respective plurality of computing nodes associated with at least one of the plurality of computing node clusters in response to installation of the additional computing node cluster.

15. The non-transitory computer readable medium of claim 12, further comprising instructions that when executed on one or more processor units, cause the one or more processor units to decrease a power budget limit of respective power budget rules for a respective plurality of computing nodes associated with at least one of the plurality of computing node clusters in response to removal of one of the plurality of computing node clusters from the computing rack system.

16. The non-transitory computer readable medium of claim 12, further comprising instructions that when executed on one or more processor units, cause the one or more processor units to adjust a power budget limit of respective power budget rules for a respective plurality of computing nodes associated with at least one of the plurality of computing node clusters based on at least one of cluster priority, time of day, or day.

17. At least one non-transitory computer-readable storage medium including instructions that when executed by a power management system, cause the power management system to:
   receive, at the power management system, respective power consumption data corresponding to each of a plurality of computing node clusters of a computing rack system;
   determine respective power consumption of each of the plurality of computing node clusters relative to a respective power consumption budget limit for each of the plurality of computing node clusters based on the respective power consumption data to determine a respective usage ratio; and
   in response to a determination that the respective usage ratio of a first computing node cluster of the plurality of computing node clusters is greater than a first threshold:
      decrease the respective power budget limit associated with a second computing node cluster of the plurality of computing node clusters in response to a determination that the respective usage ratio of the second computing node cluster is less than a second threshold; and
      increase the respective power budget limit of the first computing node cluster.

18. The at least one computer-readable storage medium of claim of claim 17, wherein the instructions further cause the power management system to:
   in response to the increase of the respective power budget limit of the first computing node cluster exceeding the decrease of the respective power budget limit of the second computing node cluster, decrease the respective power budget limit associated with a third computing node cluster of the plurality of computing node clusters in response to a determination that the respective usage ratio of the third computing node cluster is less than the second threshold.

19. The at least one computer-readable medium of claim 17, wherein increasing the respective power budget limit of the first computing node cluster is by a first amount, wherein the instructions further cause the power management system to increase the respective power budget limit of the first computing node cluster by a second amount in response to a determination that the respective usage ratio of the first computing node cluster is greater than a third threshold that is greater than the first threshold.

20. The at least one computer-readable medium of claim 19, wherein the instructions further cause the power management system to, prior to increasing the respective power budget limit associated with the first computing node cluster and decreasing the respective power budget limit associated with the second computing node cluster:
  determine whether increasing the respective power budget limit associated with the fist computing node cluster in aggregate with all existing respective power budget limits associated with the other computing node clusters of the plurality of computing node clusters exceeds a maximum power consumption threshold; and
  reduce the increase of the respective power budget limit associated with the fist computing node from a first amount to a second amount in response to a determination that the increase of the first amount in aggregate with all existing respective power budget limits associated with the other computing node clusters of the plurality of computing node clusters exceeds the maximum power consumption threshold.

21. A system comprising:
  a plurality of computing node clusters each comprising a respective plurality of computing nodes; and
  a power management system executed on a processor configured to determine respective power budget rules associated with each of the plurality of computing node clusters based on a maximum power consumption limit, wherein the power management system is further configured to provide the respective power budget rules to an associated one of the plurality of computing node clusters;
  wherein the power management system is further configured to receive respective power consumption data from each of the plurality of computing node clusters and to adjust the respective power budget rules associated with at least one of the plurality of computing node clusters based on a usage ratio determined by assessing individual power consumption of the plurality of computing node clusters relative to the respective power budget rules.

22. The system of claim 21, wherein the power management system is further configured to decrease power budget limits of the respective power budget rules associated with a first one of the plurality of computing node clusters in response to the usage ratio of the first one of the plurality of computing node clusters being less than a threshold.

23. The system of claim 21, wherein the power management system is further configured to increase power budget limits of the respective power budget rules associated with a second one of the plurality of computing node clusters in response to the usage ratio of the second one of the plurality of computing node clusters being greater than a threshold.

24. The system of claim 23, wherein the power management system is further configured to, prior to increasing power budget limits of the respective power budget rules associated with the second one of the plurality of computing node clusters, when a net power budget limit change is a power budget increase, determining whether the increase, when added to all other respective power budget rule limits, exceeds the maximum power consumption threshold.

25. The system of claim 24, wherein the power management system is further configured to, responsive to a determination that the net power budget limit increase added to the existing power budget limits of each of the plurality of computing node clusters will exceed the maximum power consumption threshold, reduce the power budget limit increase.

* * * * *